(12) United States Patent
Karuppaiah et al.

(10) Patent No.: US 12,341,229 B2
(45) Date of Patent: Jun. 24, 2025

(54) SOLID OXIDE FUEL CELL SYSTEM WITH HYDROGEN PUMPING CELL WITH CARBON MONOXIDE TOLERANT ANODES AND INTEGRATED SHIFT REACTOR

(71) Applicant: Bloom Energy Corporation, San Jose, CA (US)

(72) Inventors: Chockkalingam Karuppaiah, San Jose, CA (US); Michael Gasda, San Jose, CA (US); Arne Ballantine, San Jose, CA (US); Martin Perry, San Jose, CA (US); Andy Ta, San Jose, CA (US); Kyle Kekelis, San Jose, CA (US); Srikanth Ranganathan, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/126,604

(22) Filed: Mar. 27, 2023

(65) Prior Publication Data
US 2023/0231172 A1 Jul. 20, 2023

Related U.S. Application Data

(63) Continuation of application No. 16/790,269, filed on Feb. 13, 2020, now Pat. No. 11,616,249.
(Continued)

(51) Int. Cl.
*H01M 8/241* (2016.01)
*C01B 3/16* (2006.01)
(Continued)

(52) U.S. Cl.
CPC ............ *H01M 8/241* (2013.01); *C01B 3/16* (2013.01); *C01B 3/38* (2013.01); *C01B 3/50* (2013.01);
(Continued)

(58) Field of Classification Search
CPC ............ H01M 8/241; H01M 8/04074; H01M 8/04164; H01M 8/0681; H01M 4/9041; C01B 3/16
See application file for complete search history.

(56) References Cited

U.S. PATENT DOCUMENTS 6,106,964 A 8/2000 Voss et al.
7,422,810 B2 9/2008 Venkataraman et al.
(Continued)

FOREIGN PATENT DOCUMENTS

EP 3108532 B1 10/2018
JP 2009-503790 A 1/2009
(Continued)

OTHER PUBLICATIONS

Japan Patent Office, Official Action for Japanese Patent Application No. 2021-556763, mailed Feb. 27, 2024, 7 pages.
(Continued)

*Primary Examiner* — Matthew J Merkling
(74) *Attorney, Agent, or Firm* — THE MARBURY LAW GROUP PLLC

(57) ABSTRACT

A fuel cell system includes a fuel cell stack, a fuel inlet conduit configured to provide a fuel to a fuel inlet of the fuel cell stack, an electrochemical pump separator containing an electrolyte, a cathode, and a carbon monoxide tolerant anode, a fuel exhaust conduit that operatively connects a fuel exhaust outlet of the fuel cell stack to an anode inlet of the electrochemical pump separator, and a product conduit which operatively connects a cathode outlet of the electrochemical pump separator to the fuel inlet conduit.

20 Claims, 6 Drawing Sheets

Related U.S. Application Data

(60) Provisional application No. 62/822,198, filed on Mar. 22, 2019.

(51) Int. Cl.

| | | |
|---|---|---|
| *C01B 3/38* | (2006.01) | |
| *C01B 3/50* | (2006.01) | |
| *H01M 4/90* | (2006.01) | |
| *H01M 8/04007* | (2016.01) | |
| *H01M 8/04089* | (2016.01) | |
| *H01M 8/04119* | (2016.01) | |
| *H01M 8/0612* | (2016.01) | |
| *H01M 8/0662* | (2016.01) | |
| *H01M 8/0668* | (2016.01) | |

(52) U.S. Cl.
CPC ..... *H01M 4/9041* (2013.01); *H01M 8/04074* (2013.01); *H01M 8/04097* (2013.01); *H01M 8/04164* (2013.01); *H01M 8/0668* (2013.01); *H01M 8/0681* (2013.01); *C01B 2203/066* (2013.01); *H01M 8/04141* (2013.01); *H01M 8/0618* (2013.01); *Y02E 60/50* (2013.01)

(56) References Cited

U.S. PATENT DOCUMENTS

| | | | |
|---|---|---|---|
| 7,482,078 B2 | 1/2009 | Sridhar et al. | |
| 7,520,916 B2 | 4/2009 | McElroy et al. | |
| 7,833,668 B2 | 11/2010 | Ballantine et al. | |
| 7,883,803 B2 | 2/2011 | McElroy et al. | |
| 8,101,307 B2 | 1/2012 | McElroy et al. | |
| 9,190,673 B2 | 11/2015 | Venkataraman et al. | |
| 2002/0142208 A1 | 10/2002 | Keefer et al. | |
| 2002/0172630 A1* | 11/2002 | Ahmed ................. B01J 8/0465 423/652 | |
| 2003/0162067 A1 | 8/2003 | McElroy | |
| 2003/0196893 A1 | 10/2003 | McElroy et al. | |
| 2004/0148862 A1 | 8/2004 | Yu et al. | |
| 2004/0177554 A1 | 9/2004 | Yu et al. | |
| 2004/0197627 A1* | 10/2004 | Yan ..................... H01M 8/0668 429/483 | |
| 2004/0202914 A1 | 10/2004 | Sridhar et al. | |
| 2004/0226217 A1* | 11/2004 | Ahmed .................. C01B 3/382 48/119 | |
| 2004/0226218 A1* | 11/2004 | Izawa ...................... C01B 3/38 48/119 | |
| 2005/0164051 A1 | 7/2005 | Venkataraman et al. | |
| 2005/0217179 A1 | 10/2005 | Reinke et al. | |
| 2007/0178338 A1 | 8/2007 | McElroy et al. | |
| 2008/0057359 A1 | 3/2008 | Venkataraman et al. | |
| 2008/0241638 A1 | 10/2008 | McElroy et al. | |
| 2009/0258259 A1 | 10/2009 | Leshchiner et al. | |
| 2010/0239924 A1 | 9/2010 | McElroy et al. | |
| 2010/0266923 A1 | 10/2010 | McElroy et al. | |
| 2011/0281185 A1 | 11/2011 | Sridhar et al. | |
| 2012/0178003 A1 | 7/2012 | Venkataraman et al. | |
| 2013/0108936 A1 | 5/2013 | McElroy et al. | |
| 2015/0255818 A1 | 9/2015 | Benicewicz et al. | |
| 2017/0250429 A1 | 8/2017 | Diethelm et al. | |
| 2019/0393525 A1* | 12/2019 | Diethelm ............ H01M 8/0637 | |

FOREIGN PATENT DOCUMENTS

| | | |
|---|---|---|
| JP | 2009-087809 A | 4/2009 |
| JP | 2009-524208 A | 6/2009 |
| JP | 2016-115479 A | 6/2016 |
| JP | 2020132934 A | 8/2020 |
| KR | 10-2008-0078895 A | 8/2008 |

OTHER PUBLICATIONS

Notification Concerning Transmittal of International Preliminary Report on Patentability and Written Opinion of the International Search Authority for International Patent Application No. PCT/US2020/023089 mailed Oct. 7, 2021, 11 pages.

Malavasi, L. et al., "Oxide-Ion And Proton Conducting Electrolyte Materials For Clean Energy Applications: Structural And Mechanistic Features," Chem. Soc. Rev., vol. 39, pp. 4370-4387, (2010), https://dol.org/10.1039/B915141A.

Notification of Transmittal of the International Search Report and Written Opinion of the International Search Authority for International Patent Application No. PCT/US2020/023089 mailed Jul. 14, 2020, 15 pages.

Any information that are not included with this Information Disclosure Statement can be found in U.S. Appl. No. 16/790,269.

European Patent Office Communication, Extended European Search Report for European Patent Application No. 20776948.0, mailed May 29, 2024, 7 pages.

First examination report (FER) issued by the Indian Patent Office (IPO) for Indian Patent Application No. 202147039864, mailed Sep. 17, 2024, 6 pages.

\* cited by examiner

SOLID OXIDE FUEL CELL SYSTEM WITH HYDROGEN PUMPING CELL WITH CARBON MONOXIDE TOLERANT ANODES AND INTEGRATED SHIFT REACTOR

PRIORITY INFORMATION

This application claims is a continuation of U.S. patent application Ser. No. 16/790,269 filed on Feb. 13, 2020 which claims the benefit of U.S. Provisional Patent Application No. 62/822,198 filed on Mar. 22, 2019, all of which is hereby incorporated by reference in its entirety.

FIELD

The present disclosure relates generally to fuel cell systems and more particularly to fuel cell systems with electrochemical fuel exhaust fuel recovery.

BACKGROUND

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to one embodiment of the present disclosure, a fuel cell system includes a fuel cell stack, a fuel inlet conduit configured to provide a fuel to a fuel inlet of the fuel cell stack, an electrochemical pump separator containing an electrolyte, a cathode, and a carbon monoxide tolerant anode, a fuel exhaust conduit that operatively connects a fuel exhaust outlet of the fuel cell stack to an anode inlet of the electrochemical pump separator, and a product conduit which operatively connects a cathode outlet of the electrochemical pump separator to the fuel inlet conduit.

According to another embodiment of the present disclosure, a method of operating a fuel cell system includes providing a fuel inlet stream to a fuel inlet of a fuel cell stack, providing a fuel exhaust from a fuel exhaust outlet of the fuel cell stack to an anode inlet of the electrochemical pump separator comprising an electrolyte, a cathode, and a carbon monoxide tolerant anode, and providing hydrogen output from a cathode outlet of the electrochemical pump separator to the fuel inlet stream.

According to one embodiment of the present disclosure, a fuel cell system includes a fuel cell stack, an electrochemical pump separator, a water-gas shift (WGS) catalyst integrated with the electrochemical pump separator, a fuel exhaust conduit that operatively connects a fuel exhaust outlet of the fuel cell stack to an anode inlet of the electrochemical pump separator, and a product conduit that operatively connects a cathode outlet of the electrochemical pump separator to a fuel inlet conduit configured to provide fuel to a fuel inlet of the fuel cell stack.

DETAILED DESCRIPTION OF THE PREFERRED EMBODIMENTS

The first and second embodiments of the invention illustrate how the electrochemical pump separator is used together with a fuel cell system, such as a solid oxide fuel cell system. It should be noted that other fuel cell systems may also be used.

In the system of the first embodiment, a fuel humidifier is used to humidify the fuel inlet stream provided to the fuel cell stack. In the system of the second embodiment, the fuel humidifier may be omitted. A portion of the fuel cell stack fuel exhaust stream is directly recycled into the fuel inlet stream to humidify the fuel inlet steam. Another portion of the fuel cell stack fuel exhaust stream is provided to the separator, and the separated hydrogen is then provided to the fuel inlet stream.

Figure 1:
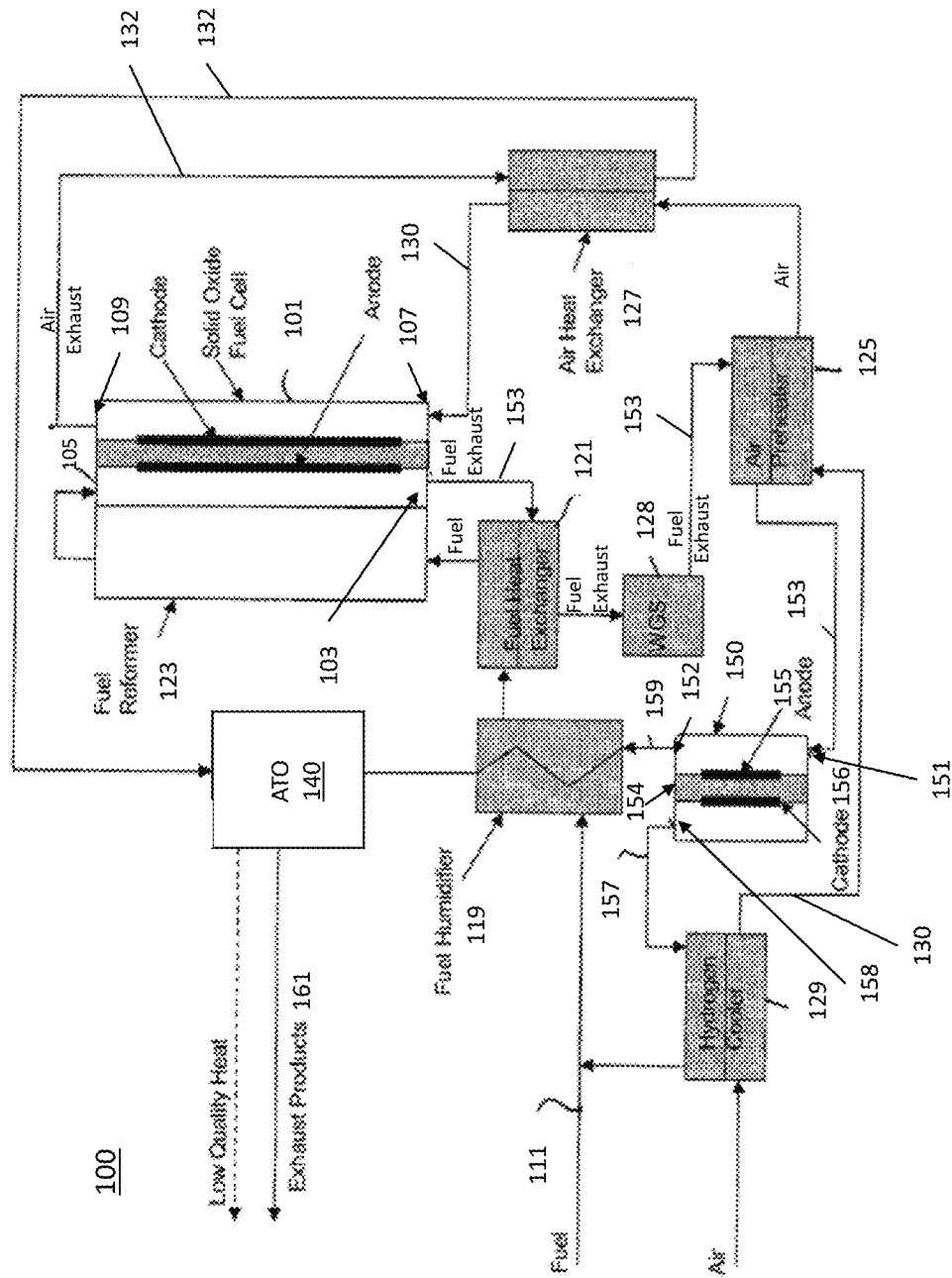
FIGS. 1, 2, 3A and 4A are schematic diagrams of fuel cell systems according to respective first, second, third and fourth embodiments of the present disclosure.

FIG. 1 is a schematic showing a fuel cell system 100 according to the first embodiment of the present disclosure. The system 100 contains a fuel cell stack 101, such as a solid oxide fuel cell stack (illustrated schematically to show one solid oxide fuel cell of the stack containing a ceramic electrolyte, such as yttria stabilized zirconia (YSZ), an anode electrode, such as a nickel-YSZ cermet, and a cathode electrode, such as lanthanum strontium manganite).

The system 100 also contains an electrochemical pump separator 150 that electrochemically separates hydrogen from the fuel exhaust stream. The pump separator 150 may comprise any suitable proton exchange membrane device comprising a polymer electrolyte 154. The hydrogen diffuses through the polymer electrolyte under an application of a potential difference between anode and cathode electrodes located on either side of the electrolyte. Preferably, the pump separator 150 comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode 155 and cathode 156 electrodes. The membrane is doped with an acid, such as sulfuric or phosphoric acid. An example of such cell is disclosed in US published application US 2003/0196893 A1, incorporated herein by reference in its entirety. These cells generally operate in a temperature range of above 100 to about 200 degrees Celsius. Thus, the heat exchangers in the system 100 preferably keep the fuel exhaust stream at a temperature of about 120 to about 200 degrees Celsius, such as about 160 to about 190 degrees Celsius.

The system 100 also contains a first fuel exhaust conduit 153 that operatively (i.e., fluidly) connects a fuel exhaust outlet 103 of the fuel cell stack 101 an anode inlet 151 of the pump separator 150. The system 100 also contains a product conduit 157 that operatively (i.e., fluidly) connects a cathode outlet 158 of the pump separator 150 to a fuel inlet conduit 111 that operatively (i.e., fluidly) connects a fuel inlet 105 of the stack 101 to an external fuel source. The system 100 also contains a separator exhaust conduit 159 that operatively (i.e., fluidly) connects an anode outlet 152 of the pump separator 150 to an anode tail gas oxidizer (ATO) 140 or to an atmospheric vent.

The system 100 further includes a fuel humidifier 119 operatively connected to the fuel inlet conduit 111 and the separator exhaust conduit 159. In operation, the fuel humidifier 119 humidifies fuel in fuel conduit 111, which includes recycled hydrogen, using water vapor contained the separator exhaust output to the separator exhaust conduit 159. The fuel humidifier 119 may comprise a polymeric membrane humidifier, such as a Nafion® membrane humidifier, an enthalpy wheel or a plurality of water adsorbent beds, as described for example in U.S. Pat. No. 6,106,964 and in U.S. application Ser. No. 10/368,425, both incorporated herein by reference in their entirety. For example, one suitable type of humidifier comprises a water vapor and enthalpy transfer Nafion® based, water permeable membrane available from Perma Pure LLC. The fuel humidifier 119 passively transfers water vapor and enthalpy from the fuel exhaust stream into the fuel inlet stream to provide a 2 to 2.5 steam to carbon ratio in the fuel inlet stream. The temperature of the fuel in the fuel inlet conduit 111 may be raised to about 80 to about 90 degrees Celsius, by the fuel humidifier 119.

The system 100 also contains a recuperative heat exchanger 121 (e.g., anode recuperator) operatively connected to the fuel inlet conduit 111 and the fuel exhaust conduit 153. The heat exchanger 121 heats the fuel in the fuel inlet conduit 111 using heat extracted from the fuel exhaust in the fuel exhaust conduit 103. The heat exchanger 121 helps to raise the temperature of the incoming fuel and reduces the temperature of the fuel exhaust, so that it may be further cooled in the condenser and such that it does not damage the fuel humidifier 119.

If the fuel cells are external fuel reformation type cells, then the system 100 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively, and/or conductively by the heat generated in the fuel cell stack 101 and/or by the heat generated in an optional ATO 140, as described in U.S. Pat. No. 7,422,810, filed Dec. 2, 2004, incorporated herein by reference in its entirety. Alternatively, the external reformer 123 may be omitted if the stack 101 contains cells of the internal reforming type, where reformation occurs primarily within the fuel cells of the stack.

The system 100 also includes an air inlet conduit 130 fluidly connected to an air inlet 107 of the stack 101. Optionally, the system 100 includes an air preheater heat exchanger 125 operatively connected to the air inlet conduit 130 and configured to preheat the air in the air inlet conduit 130 using heat extracted from the fuel exhaust in the fuel exhaust conduit 153. If desired, this heat exchanger 125 may be omitted.

The system 100 also includes an air exhaust conduit 132 fluidly connecting an air exhaust outlet 109 of the stack 101 to the ATO 140. The system 100 preferably contains an air heat exchanger 127 operatively connected to the air inlet conduit 130 and the air exhaust conduit 132. This heat exchanger 127 further heats the air in the air inlet conduit 130 using heat extracted from the fuel cell stack air exhaust (i.e., oxidizer or cathode exhaust) in the air exhaust conduit 132. If the preheater heat exchanger 125 is omitted, then the air is provided directly into the heat exchanger 127 by a blower or other air intake device.

The system 100 also optionally includes an optional hydrogen cooler heat exchanger 129 operatively connected to the product conduit 157 and the air inlet conduit 130. The heat exchanger 129 extracts heat from the separated hydrogen output from the pump separator 150, using air flowing through the air inlet conduit 130.

The system 100 may also contain an optional water-gas shift (WGS) reactor 128 operatively connected to the fuel exhaust conduit 153. The WGS reactor 128 may be any suitable device that converts at least a portion of the water in the fuel exhaust into free hydrogen ($H_2$). For example, the WGS reactor 128 may comprise a tube or conduit containing a catalyst that converts some or all of the carbon monoxide and water vapor in the fuel exhaust stream into carbon dioxide and hydrogen. Thus, the WGS reactor 128 increases the amount of hydrogen in the fuel exhaust. The catalyst may be any suitable catalyst, such as an iron oxide or a chromium-promoted iron oxide catalyst. The WGS reactor 128 may be operatively connected to the fuel exhaust conduit 153, between the fuel heat exchanger 121 and the air preheater heat exchanger 125.

The system 100 may operate as follows. A fuel inlet stream (also referred to as "fuel" or "fuel stream") is provided to the fuel cell stack 101 through fuel inlet conduit 111. The fuel may comprise any suitable hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

As the fuel stream passes through the humidifier 119, the fuel stream is humidified. The humidified fuel then passes through the fuel heat exchanger 121 where the humidified fuel is heated by the fuel cell stack fuel exhaust. The heated and humidified fuel is then provided into the fuel reformer 123, which is preferably an external reformer. For example, the fuel reformer 123 may comprise a reformer described in U.S. Pat. No. 7,422,810, filed on Dec. 2, 2004, incorporated herein by reference in its entirety.

The fuel reformer 123 may be any suitable device that is capable of partially or wholly reforming a hydrocarbon fuel to form a carbon-containing and free-hydrogen-containing fuel. For example, the fuel reformer 123 may be any suitable device which can reform a hydrocarbon gas into a gas mixture of free hydrogen and a carbon containing gas. For example, the fuel reformer 123 may comprise a catalyst coated passage where a humidified biogas, such as natural gas, is reformed via a steam-methane reformation reaction to form free hydrogen, carbon monoxide, carbon dioxide, water vapor and optionally a residual amount of unreformed biogas. The free hydrogen and carbon monoxide are then provided into the fuel (i.e., anode) inlet 105 of the fuel cell stack 101. Thus, with respect to a fuel flow direction in the fuel inlet conduit 111, the humidifier 119 is located upstream of the heat exchanger 121, which is located upstream of the reformer 123, which is located upstream of the stack 101.

The air or other oxygen containing gas (i.e., oxidizer) (also referred to as an "air inlet stream" or "air stream") that is provided to the stack 101 through the air inlet conduit 130 is heated by the air heat exchanger 127, using the cathode exhaust in the air exhaust conduit 132. If desired, the air in the air inlet conduit 130 may also pass through the hydrogen cooler heat exchanger 129 and/or through the air preheater heat exchanger 125, to further increase the temperature of the air stream, before providing the air into the stack 101.

During operation, the stack 101 generates electricity using the provided fuel and air, and generates the fuel exhaust and the air exhaust. The fuel exhaust may contain hydrogen, water vapor, carbon monoxide, carbon dioxide, some unreacted hydrocarbon fuel such as methane, and other reaction by-products and impurities. The fuel exhaust may include about 25% of the fuel provided to the stack 101.

The fuel exhaust is output from the fuel exhaust outlet 103 and provided to the pump separator 150 by the fuel exhaust conduit 153. The pump separator 150 electrochemically separates at least a portion of the hydrogen ($H_2$) contained in the fuel exhaust. The separated hydrogen is output from the cathode outlet 158 and provided to the fuel inlet conduit 111 by the product conduit 157 where the hydrogen and is mixed with incoming fresh fuel. Preferably, the hydrogen is provided to the fuel inlet conduit 111 upstream of the humidifier 119.

The fuel exhaust stream in the fuel exhaust conduit 153 is first provided into the heat exchanger 121, where its temperature is lowered, preferably to less than 200° C., while the temperature of the incoming fuel is raised. If the WGS reactor 128 and the air preheater heat exchanger 125 are present, then the fuel exhaust is provided through the WGS reactor 128 to convert at least a portion of the water vapor and a majority of the residual carbon monoxide into carbon dioxide and hydrogen. The temperature of the fuel exhaust is then further reduced while passing through the heat exchanger 125, by transferring heat to the air in the air inlet conduit 130. The temperature of the fuel exhaust may be reduced to from about 90 to 110° C., for example.

The fuel exhaust is then provided to the anode inlet 151 of the pump separator 150 via conduit 153. The separator 150 may be configured to separate a majority of the hydrogen from the fuel exhaust, such as about 85% of the hydrogen in the fuel exhaust stream. In particular, the hydrogen diffuses through the electrolyte of the cells in the separator 150, while allowing the water vapor, carbon dioxide, carbon monoxide and remaining hydrocarbon gas in the fuel exhaust to be provided to the humidifier 119 by conduit 159.

In the fuel humidifier 119, a portion of the water vapor in the fuel exhaust is transferred to the fuel in the fuel inlet conduit 111 to humidify the fuel. The fuel may be humidified to 80° C. to 90° C. dew point. The remainder of the fuel exhaust stream is then provided into the ATO 140 along with the air (i.e., cathode) exhaust from the stack 101, where the gasses are oxidized to provide low quality heat. The exhaust from the ATO may be provided to an ATO exhaust conduit 161. Heat from the ATO 140 may be used to heat the reformer 123, it may be provided to other parts of the system 100, or may be provided to devices outside the system 100, such as a building heating system.

The hydrogen separated by the pump separator 150 is output from the outlet 158 and provided by the product conduit 157 to the fuel inlet conduit 111, where it is mixed with incoming fuel. If desired, prior to being provided to the fuel inlet conduit 111, the hydrogen may be cooled in heat exchanger 129, where the hydrogen stream exchanges heat with air in the air inlet conduit 130. The temperature of the hydrogen is lowered in the heat exchanger 129 before being provided into the fuel inlet conduit 111. Thus, the hydrocarbon fuel is mixed with a low dew point, near ambient temperature, recycled hydrogen recovered from the anode exhaust gas with the electrochemical hydrogen pump separator 150.

Thus, with respect to the flow direction of the fuel exhaust, the heat exchanger 121 is located upstream of the WGS reactor 128, which is located upstream of the heat exchanger 125, which is located upstream of the pump separator 150, which is located upstream of the humidifier 119 and the fuel inlet conduit 111.

Figure 2:
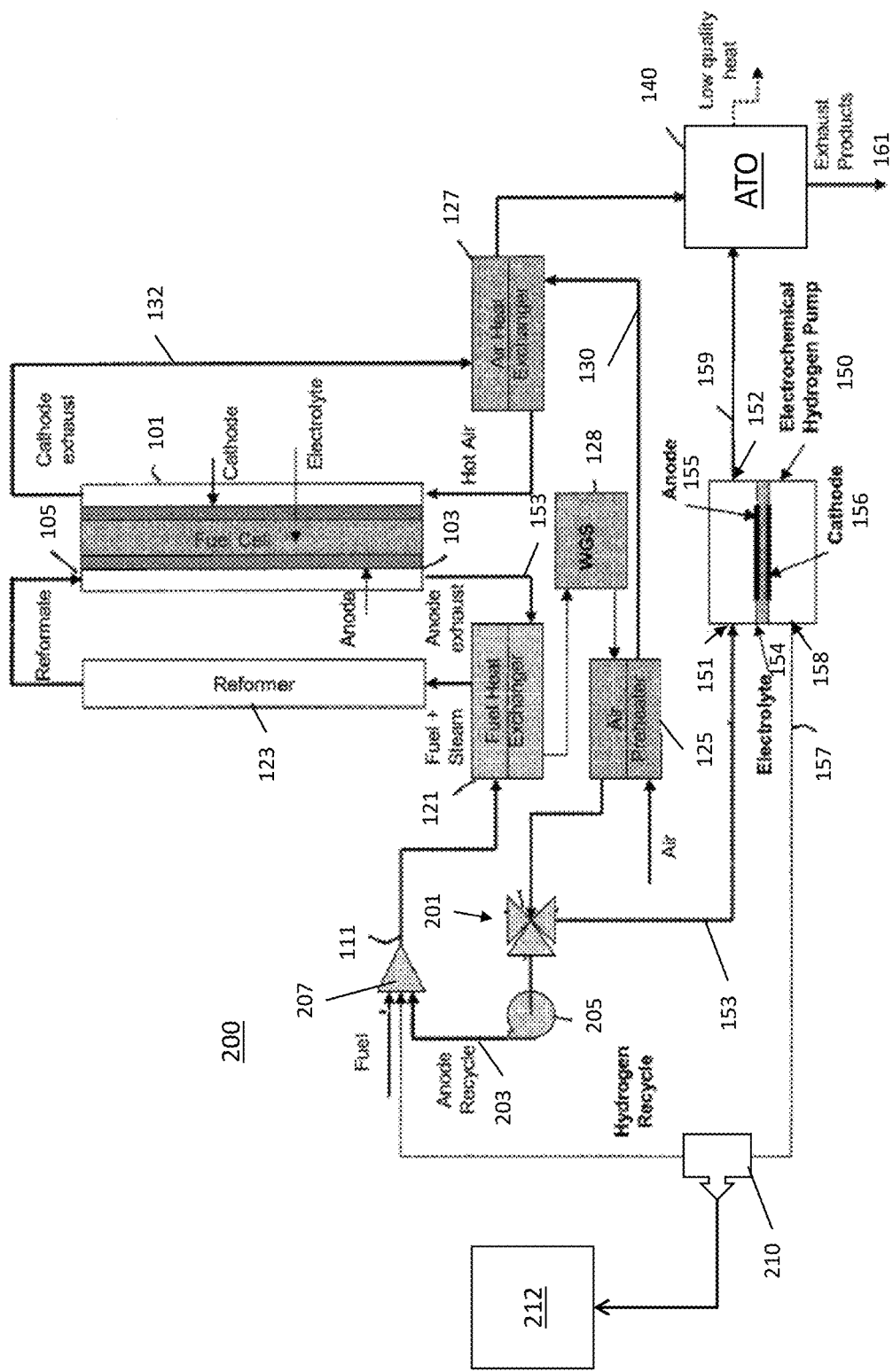

FIG. 2 is a schematic showing a fuel cell system 200 according to the second embodiment of the present disclosure. The system 200 is similar to system 100 and contains a number of components in common. Those components which are common to both systems 100 and 200 are numbered with the same numbers in FIGS. 1 and 2 and will not be described further.

One difference between systems 100 and 200 is that system 200 preferably, but not necessarily lacks, the humidifier 119. Instead, a portion of the water vapor containing stack fuel exhaust stream is directly recycled into the stack fuel inlet stream. The water vapor in the fuel exhaust stream is sufficient to humidify the fuel inlet stream.

The system 200 may contain a fuel exhaust splitter 201, a recycling conduit 203, a blower or compressor 205, and a mixer 207. The splitter 201 may be a computer or operator controlled multi-way valve, for example a three-way valve, or another fluid splitting device. The splitter 201 may be operatively connected to the fuel exhaust conduit 153 and the recycling conduit 203. In particular, the splitter 201 may be configured to selectively divert all or a portion of the fuel exhaust in the fuel exhaust conduit 153 to the recycling conduit 203.

The mixer 207 may be operatively connected to the fuel inlet conduit 111, the recycling conduit 203, and the product conduit 157. The recycling conduit 203 may fluidly connect the splitter 201 to the mixer 207. The mixer 207 may be configured to mix fresh fuel with fuel exhaust provided by the recycling conduit 203 and/or hydrogen provided by the product conduit 157.

The blower or compressor 205 may be operatively connected to the recycling conduit 203. The blower or compressor 205 may be configured to move the fuel exhaust through the recycling conduit 203 to the mixer 207. In operation, the blower or compressor 205 controllably provides a desired amount of the fuel exhaust to the fuel inlet conduit 111, via the mixer 207.

The method of operating the system 200 is similar to the method of operating the system 100. One difference is that the fuel exhaust is separated into at least two streams by the splitter 201. The first fuel exhaust stream is recycled to the fuel inlet stream, while the second stream is directed into the pump separator 150 where at least a portion of hydrogen contained in the second fuel exhaust stream is electrochemically separated from the second fuel exhaust stream. The hydrogen separated from the second fuel exhaust stream is then provided into the fuel inlet conduit 111 by the product conduit 157. For example, between 50% and 70%, such as about 60% of the fuel exhaust may be provided to the blower or compressor 205, while the remainder may be provided toward the pump separator 150.

Preferably, the fuel exhaust first flows through the heat exchangers 121 and 125, and the WGS reactor 128, before being provided into the splitter 201. The fuel exhaust may be cooled to about 200° C. or less, such as to about 120° C. to about 180° C., in the heat exchanger 125, and prior to being provided into the splitter 201 where it is divided into two streams. This allows the use of a low temperature blower 205 to controllably recycle a desired amount of the fuel exhaust stream into the fuel inlet conduit 111, since such a blower may be adapted to move a gas stream that has a temperature of about 200° C. or less.

The blower or compressor 205 may be computer or operator controlled and may vary the amount of the fuel exhaust stream being provided into the fuel inlet stream depending on the conditions described below. In some embodiments, the system 200 may optionally include a selector valve 210 operatively connected to the product conduit 157. The selector valve 210 may be fluidly connected to an auxiliary device 212, such as a hydrogen storage device a hydrogen using device, such as a PEM fuel cell in a vehicle or another hydrogen using device or to a hydrogen storage vessel. The selector valve 210 may be configured to divert a selected amount of the hydrogen in the product conduit 157 to the auxiliary device 212. For example, all or a portion of the hydrogen may be provided to either the auxiliary device 212 or the mixer 207, or the hydrogen may be alternately provided to the mixer 207 and the auxiliary device 212.

The blower or compressor 205 and the optional selector valve 210 may be operated by a computer or an operator to controllably vary the gas flow based on one or more of the following conditions: i) detected or observed conditions of the system 100 (i.e., changes in the system operating conditions requiring a change in the amount of hydrogen in the fuel inlet stream); ii) previous calculations provided into the computer or conditions known to the operator which require a temporal adjustment of the hydrogen in the fuel inlet stream; iii) desired future changes, presently occurring changes or recent past changes in the operating parameters of the stack 101, such as changes in the electricity demand by the users of electricity generated by the stack, changes in price for electricity or hydrocarbon fuel compared to the price of hydrogen, etc., and/or iv) changes in the demand for hydrogen by the hydrogen user, such as the hydrogen using device, changes in price of hydrogen or hydrocarbon fuel compared to the price of electricity, etc.

It is believed that by recycling at least a portion of the hydrogen separated from the fuel exhaust (i.e., tail) gas into the fuel inlet conduit 111, a high efficiency operation of the fuel cell system is obtained. Furthermore, the overall fuel utilization is increased. The electrical efficiency (i.e., AC electrical efficiency) can range between about 50% and about 60%, such as between about 54% and about 60% for the methods of the first and second embodiments when the per pass fuel utilization rate is about 75% (i.e., about 75% of the fuel is utilized during each pass through the stack). An effective fuel utilization of about 94% to about 95% is obtained when the per pass utilization is about 75%, and about 85% of the fuel exhaust gas hydrogen is recycled back to the fuel cell stack by the pump separator 150. Even higher efficiency may be obtained by increasing the per pass fuel utilization rate above 75%, such as about 76-80%. At steady-state, the methods of the first and second embodiments eliminate the need for generating steam when steam methane reformation is used to create the feed gas to the fuel cell. The fuel exhaust stream contains enough water vapor to humidify the fuel inlet stream to the stack at steam to carbon ratios of 2 to 2.5. The increase in net fuel utilization and the removal of heat requirement to generate steam increases the overall electrical efficiency. In contrast, without recycling hydrogen, the AC electrical efficiency is about 45% for a fuel utilization rate within the stack of about 75% to 80%.

According to various embodiments of the present disclosure, the pump separators 150 may include carbon-monoxide tolerant anodes 155 to remove hydrogen from the fuel exhaust stream. The fuel exhaust stream provided to the electrochemical pump separator 150 may contain a significant fraction of carbon monoxide (CO), such as reformate from the steam-reformation of natural gas used as the fuel. CO is a poison for many hydrogen pump materials, substantially increasing the pumping voltage (power). In one embodiment, electrochemical pump separator 150 contains an anode 155 that is CO-tolerant.

Accordingly, the electrochemical pump separator 150 may comprise any suitable hydrogen pump that includes a proton conductor electrolyte 154 disposed between an anode 155 and a cathode 156. A hydrogen-containing gas stream, such as the fuel cell fuel exhaust stream is fed to the anode, where the hydrogen is dissociated by a catalyst material of the anode into protons and electrons. Electrons are driven to the cathode by means of an applied voltage, driving protons to the cathode and evolving pure hydrogen gas.

Suitable electrolyte 154 materials include any suitable proton conductors, such as proton exchange membrane (PEM) or polymer electrolyte membranes such as sulfonated tetrafluoroethylene based fluoropolymer-copolymer having a chemical formula: $C_7HF_{13}O_5S.C_2F_4$ sold under the brand name Nafion®, phosphoric acid membranes described in the prior embodiments (including PBI-based phosphoric acid membranes comprising poly-phosphoric acid and polybenzomidazole polymer), proton conducting oxides include phosphates such as $LaPO_4$, solid acids (such as cesium dihydrogen phosphate, $CsH_2PO_4$), and certain perovskite ($ABO_3$) materials such as perovskite type cerates, niobates, phosphates, gallates or zirconates, such as BaCeYO (BCO), BaZrYO (BZO), LaSrPO, BaCaNbO (BCN), LaCaNbO, or LaBaGaO (LBGO) those described in *Chem. Soc. Rev.*, 2010, 39, 4370-4387, incorporated herein by reference in its entirety.

In a preferred embodiment, the anode 155 of the electrochemical pump separator 150 comprises a catalyst, such as a PtRu alloy. In another embodiment, the anode of the electrochemical pump separator 150 may comprise another CO-tolerant catalyst, such as but not limited to elemental metals or alloys comprising Ag, Al, Au, Co, Cr, Cu, Fe, Ir, Mo, Ni, Pd, Pt, Ru, Rh, W, Zn, or any combination thereof. For example, the anode catalysts may include Pt—Ru, Cu—Zn, Cu—Zn—Al, Pt—Ni, Fe—Cr, or Fe—Cr—Cu.

In some embodiments, the anode 155 optionally includes a bonding agent to secure the anode catalyst to the electrolyte 154. Suitable bonding agents include ionomers (e.g., Nafion) or polymers (e.g., polytetrafluoroethylene (PTFE)). The anode catalyst may be supported or unsupported. For example, the anode catalyst may be supported on a carbon-based material, such as carbon black (e.g., Vulcan XC 72R carbon powder or a Ketjen Black powder), a carbide material, or on a non-carbon-based material, such as tungsten oxide ($WO_x$). The anode 155 may include a single-layer, bilayer, multilayer, or gradient catalyst configuration, with respect to any combination of the catalyst, bonding agents and support.

Figure 3A:
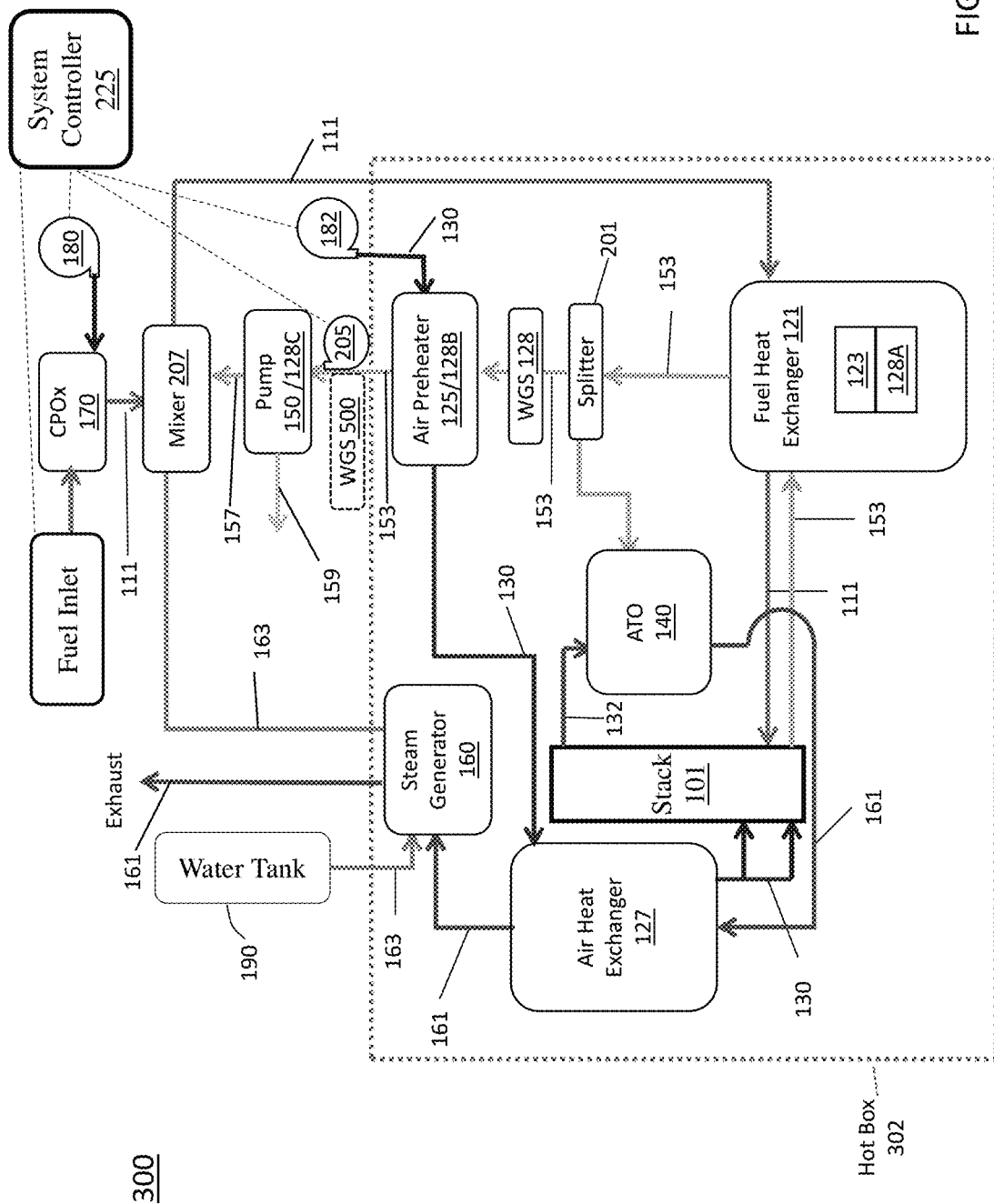

FIG. 3A is a schematic diagram of a fuel cell system 300 according to the third embodiment of the present disclosure. The system 300 may include a number of components similar to the components previously described with respect to the systems 100 and 200 of the first and second embodiments, which may be numbered with the same numbers as in FIGS. 1 and 2, and will not be described in detail.

Figure 3B:
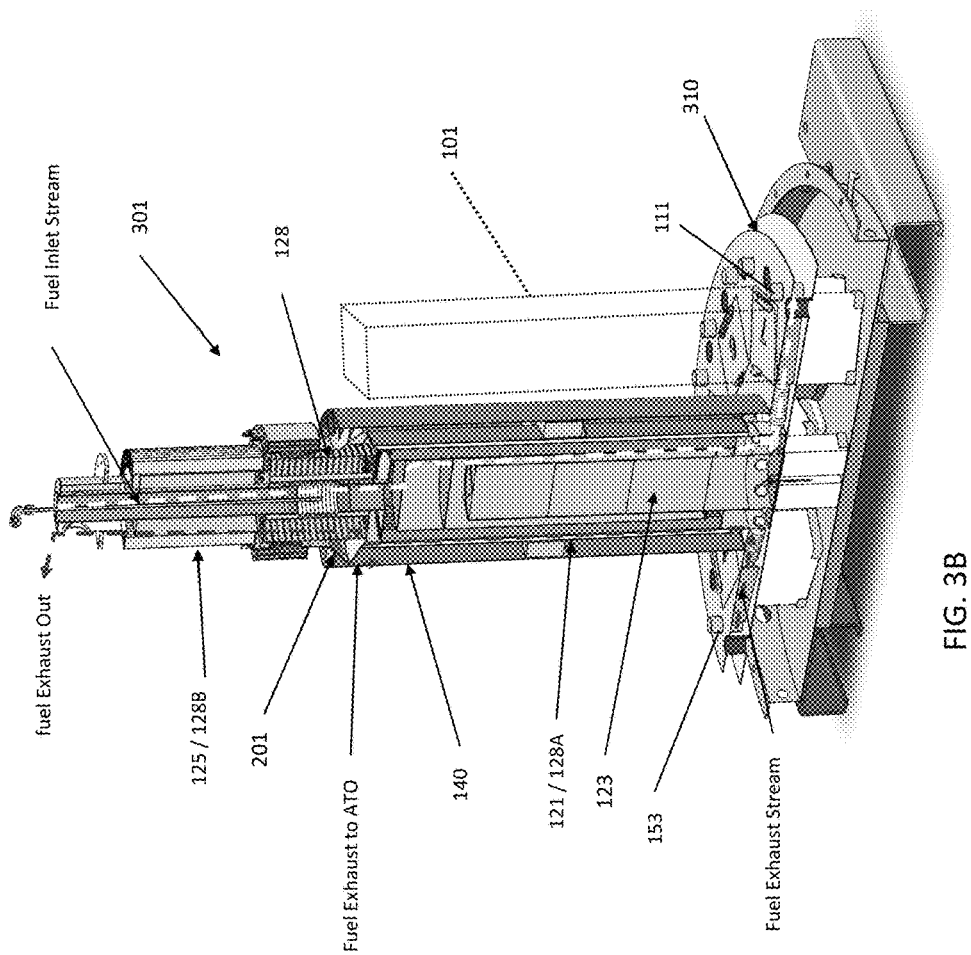
FIG. 3B is a sectional perspective view of a central column of the fuel cell system according to the third embodiment of the present disclosure.

FIG. 3B is a sectional perspective view of a central column 301 of the fuel cell system 300 according to the third embodiment of the present disclosure. Alternatively, the central column 301 may be included in either of the systems 100, 200 of the first and second embodiments. Accordingly, the central column 301 may include a number of components similar to the components previously described with respect to the systems 100, 200, which may be numbered with the same numbers as in FIGS. 1 and 2, and will not be described in detail.

In addition to the components that were described with respect to the first and second embodiments, in the system 300, the column 301 may be disposed inside a hot box 302 and a catalytic partial oxidation (CPOx) reactor 170, a CPOx blower 180 (e.g., air blower), a system blower 182 (e.g., air blower), the anode recycle blower 205, and the mixer 207 may be disposed outside of the hotbox 302. However, the present disclosure is not limited to any particular location for each of the components with respect to the hotbox 302.

Referring to FIG. 3A, the CPOx reactor 170 receives the fuel inlet stream from a fuel inlet. The fuel inlet may be a utility gas line including a valve to control an amount of fuel provided to the CPOx reactor 170. The CPOx blower 180 may provide air to the CPOx reactor 170 during system 300 start-up, and then turned off during steady-state operating mode when the fuel cell stacks 101 reach a steady-state operating temperature above 700° C., such as 750 to 900° C. The fuel in the steady state and/or a mixture of fuel and air during start-up may be provided to the mixer 207 by the fuel inlet conduit 111.

The main air blower 182 may be configured to provide an air stream (e.g., air inlet stream) to the air preheater heat exchanger 125 through air inlet conduit 130. The ATO exhaust stream flows from the ATO 140 to the air heat exchanger (e.g., cathode recuperator) 127 through the ATO exhaust conduit 161. Exhaust flows from the air heat exchanger 127 to the steam generator 160 through the ATO exhaust conduit 161. Exhaust flows from the steam generator 160 and out of the hotbox 302 through the ATO exhaust conduit 161.

Water flows from a water source 190, such as a water tank or a water pipe, to the steam generator 160 through water conduit 163. The steam generator 160 converts the water into steam using heat from the ATO exhaust provided by the ATO exhaust conduit 161. Steam is provided from the steam generator 160 to the mixer 207 through the water conduit 163. Alternatively, if desired, the steam may be provided directly into the fuel inlet stream and/or the anode exhaust stream may be provided directly into the fuel inlet stream followed by humidification of the combined fuel streams.

The system 300 may further include a system controller 225 configured to control various elements (e.g., blowers 182, 184 and 205 and the fuel control valve) of the system 300. The controller 225 may include a central processing unit configured to execute stored instructions. For example, the controller 225 may be configured to control fuel and/or air flow through the system 300, according to fuel composition data.

Referring to FIG. 3B, the central column may extend from a base 310 upon which one or more fuel cell stacks 101 may be disposed. The fuel inlet conduit 111 and fuel exhaust conduit 153 may extend from the stacks 101, through the base 310, to the column 301.

The column 301 may include cylindrical outer and inner walls that at least partially define an ATO 140. The fuel heat exchanger 121 may be disposed around the reformer 123. An optional first additional WGS reactor 128A may be incorporated into the fuel heat exchanger 121 and/or the reformer 123 by providing the WGS catalyst in the fuel heat exchanger 121 and/or the reformer 123. The ATO 140 may surround the fuel heat exchanger 121. The fuel cell stacks 101 may surround the ATO 140, and the air heat exchanger 127 (shown in FIG. 3A) may surround the fuel cell stacks 101 in the hot box 302.

The WGS reactor 128 is disposed above the fuel heat exchanger 121. The air preheater heat exchanger 125 is disposed above the WGS reactor 128. An optional second additional WGS reactor 128B may be incorporated into the air preheater heat exchanger 125 by providing the WGS catalyst in the air preheater heat exchanger 125.

The fuel exhaust conduit 153 may fluidly connect the fuel cell stacks 101, the fuel heat exchanger 121, the WGS reactor 128, and the air preheater 125. Accordingly, a fuel exhaust stream output from the stacks 101 may flow into the bottom of the column 301, along the outer surface of the fuel heat exchanger 121, and then may flow inside of the WGS reactor 128 and the air preheater heat exchanger 125, before exiting the top of the column 301.

The fuel inlet conduit 111 may fluidly connect the stacks 101, the fuel heat exchanger 121, and the fuel reformer 123 to the fuel inlet. Accordingly, a fuel inlet stream may flow into the top of the column 301, and then be provided to the fuel heat exchanger 121 and the fuel reformer 123, before exiting the bottom of the column 301 and being provided to the stacks 101.

For example, the fuel heat exchanger 121 may include a corrugated separator configured to separate the fuel inlet stream from the fuel exhaust stream. In some embodiments, a surface of the fuel heat exchanger 121 that contacts the fuel exhaust may be coated with a WGS catalyst, such that the fuel heat exchanger 121 may operate as a combined fuel heat exchanger 121 and WGS reactor 128A. In other words, the fuel heat exchanger 121 may operate to both transfer heat between the fuel inlet and fuel exhaust streams, as well as convert water and carbon monoxide in the fuel exhaust into free hydrogen and carbon dioxide. As such, an additional volume in the column 301 may be dedicated to WGS reactions, in order to increase WGS reactivity.

In some embodiments, the column 301 may include the splitter 201 configured to divert a portion of the fuel exhaust stream to the ATO 140. A remainder of the fuel exhaust stream may be cooled in the air preheater heat exchanger 125 to temperature compatible with any further processing. The air preheater heat exchanger 125 conduits which carry the fuel exhaust stream may optionally be coated in with a WGS catalyst to allow the heat exchanger 125 to perform as an optional second additional WGS reactor 128B, if further reduction in carbon monoxide content and conversion of water to hydrogen is desired.

Another optional embodiment shown in FIG. 3A includes an electrochemical pump separator 150 with an integrated third additional WGS reactor 128C catalyst. In one aspect of this optional embodiment, the anode catalyst described above is also a WGS catalyst. In another aspect of this optional embodiment, the WGS catalyst may be coated on the entire anode of the electrochemical pump separator 150 or on a portion of the anode of the electrochemical pump separator 150. In another aspect of this optional another embodiment, the WGS catalyst is located in the same housing as the electrochemical pump separator 150 such that there is no air pre-heater 125 located between the electrochemical pump separator 150 and the WGS catalyst. For example, the WGS catalyst may be coated on a surface of the anode chamber of the housing containing the electrochemical pump separator 150, such that the fuel exhaust stream passes by the WGS reactor catalyst before reaching the anode of the electrochemical pump separator 150. The WGS reactor 128C catalyst may comprise, PtRu, Cu, Cu—Zn, Cu—Zn—Al, Pt, Pt—Ni, Ni, Fe—Cr, or Fe—Cr—Cu. The WGS reactor catalyst may have an operating temperature of about 200-450° C., such as about 200-250° C., which may be desirable for maximizing conversion of carbon monoxide and water into usable hydrogen (plus waste carbon dioxide).

Figure 4B:
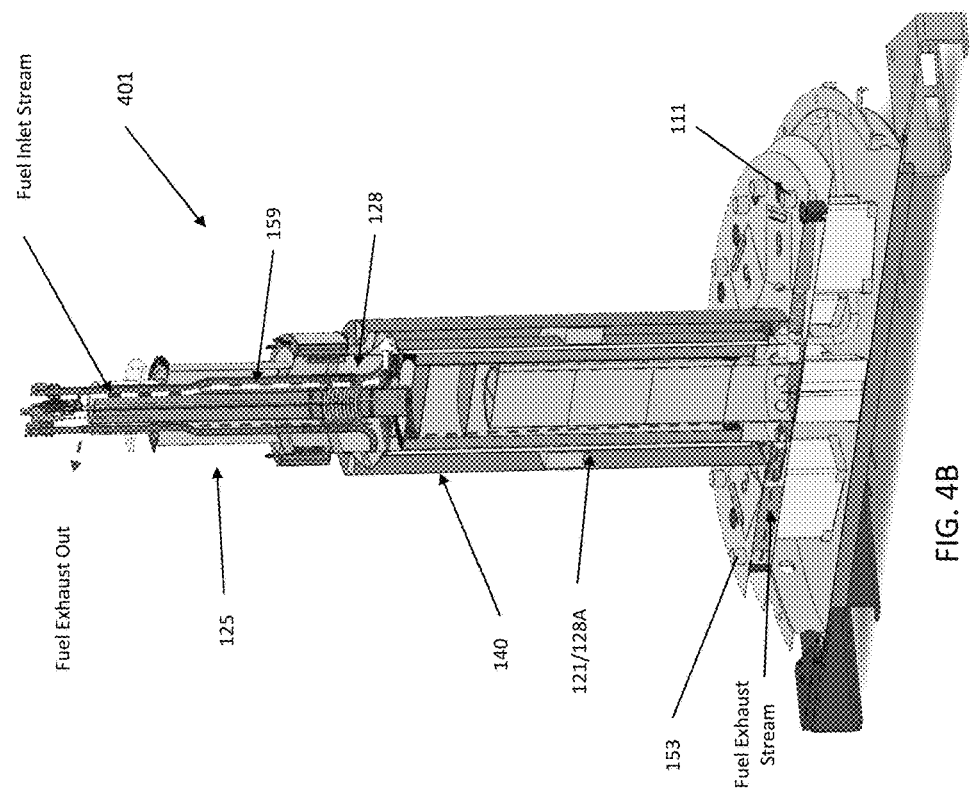
FIG. 4B is a sectional perspective view of a modified central column of the fuel cell system according to the fourth embodiment of the present disclosure.
Figure 4A:
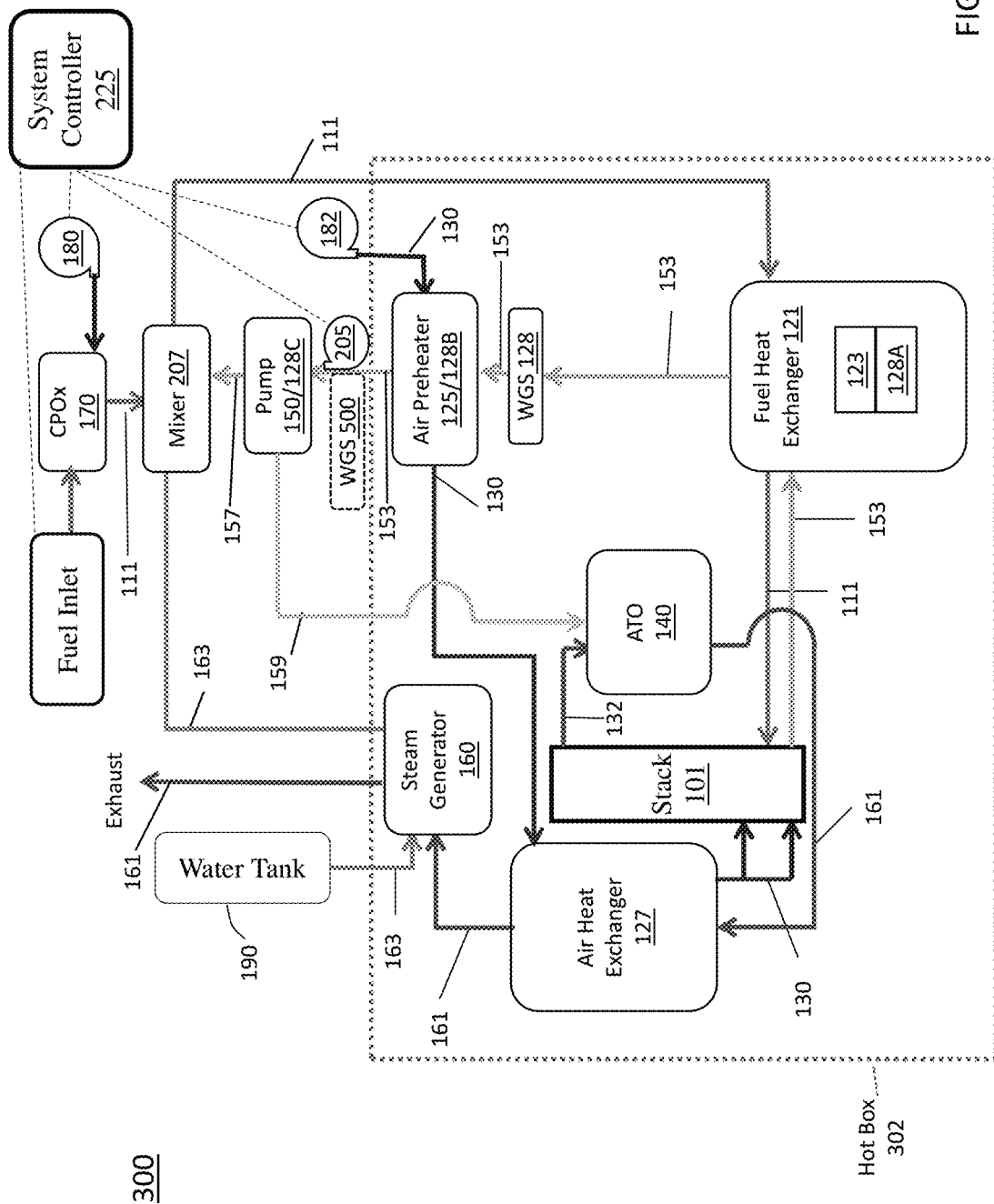

FIG. 4A is a schematic diagram of a fuel cell system 400 according to the fourth embodiment of the present disclosure. The system 400 may be similar to system 300, so only differences therebetween will be discussed in detail. FIG. 4B is a sectional perspective view of a modified central column 401, according to various embodiments of the present disclosure. The column 401 may be similar to column 301, so only differences therebetween will be discussed in detail.

In the fourth embodiment, variations to the air preheater heat exchanger 125 may be made to increase reactivity and raise the temperature of the fuel exhaust stream. Furthermore, in the fourth embodiment, the fuel exhaust stream is not provided to the ATO 140. Instead, fresh fuel and/or an output of the pump separator 150 is provided to the ATO 140 in addition to the air exhaust stream of the stack 101. Thus, in the fourth embodiment, a portion of the fuel exhaust stream is not split to be provided into the ATO 140, to allow for new fuel and/or further post processed exhaust fuel to be sent directly to the ATO 140 from the pump separator 150.

Referring to FIG. 4B, the column 401 includes an air preheater heat exchanger 125A that does not include internal fins. Accordingly, the temperature of the fuel exhaust stream exiting the heat exchanger 125A is increased, as compared to the heat exchanger 125 of FIG. 3B, which includes fins (e.g., corrugations) to increase heat transfer between the fuel exhaust and incoming air. The higher temperature may be more suitable for post processing fuel exhaust and catalyst requirements. Removing the fins also increases available volume for catalyst inside the heat exchanger for better reactivity.

In addition, the column 401 is not configured to provide a portion of the fuel exhaust stream to the ATO 140. Instead, a fuel inlet stream containing fresh fuel, or the output of the pump separator 500 or a mixture thereof, may be provided to the ATO 140. In other words, the column 401 may be configured to prevent mixing of the fuel provided to the ATO 140 and the fuel exhaust stream, and all of the fuel exhaust may be directed out of the column 401 for downstream processing in the pump separator 500.

The hydrogen rich stream is provided from the cathode 156 outlet 158 of the pump separator 500 by the product conduit 157 into the fuel inlet conduit 111. The remaining output from the anode 155 outlet 152 of the pump separator 500 is provided by the separator exhaust conduit 159 into the ATO 140 to be used as ATO fuel. The separator exhaust conduit 159 passes through the air preheater heat exchanger 125 where it may exchange heat with the fuel exhaust stream. The separator exhaust conduit 159 terminates at the splitter 201 which functions as an injector which injects the stream provided from the separator exhaust conduit 159 into the air exhaust stream in the ATO 140.

In some embodiments shown in FIGS. 3A and 4A, a fuel cell system 300 or 400 may include an additional heat exchanger and/or WGS reactor 500 outside the hot box 302 catalyst to further process fuel exhaust output from a central column (e.g., columns 301, 401).

Figure 5:
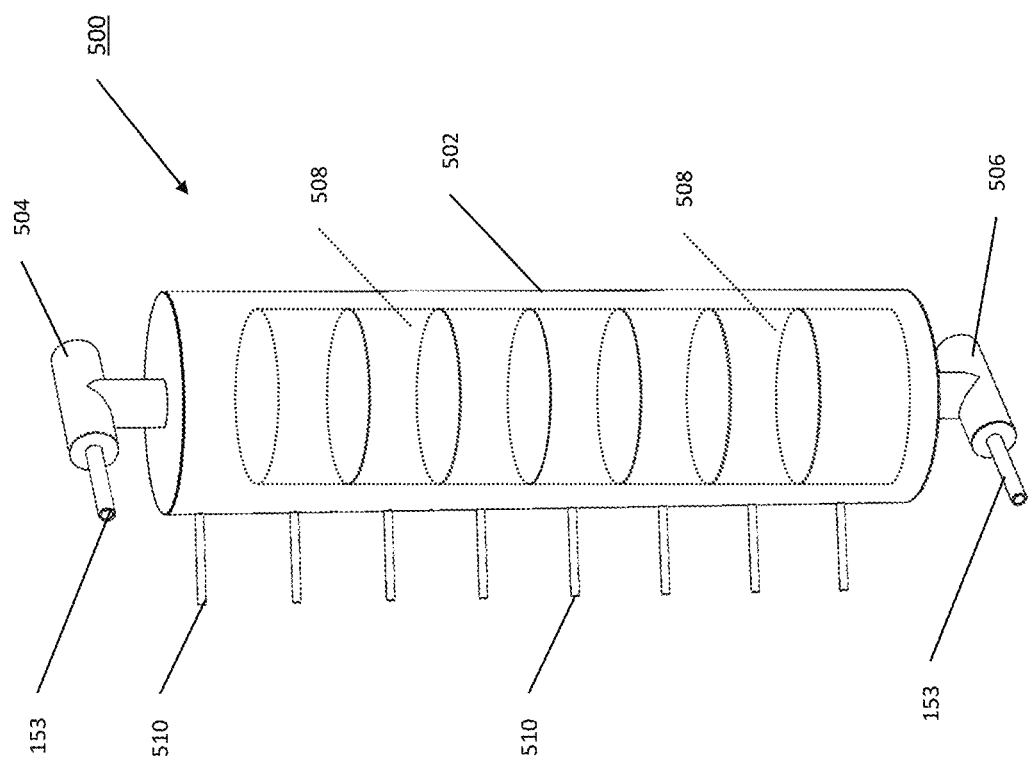
FIG. 5 is a perspective view of a WGS reactor that may be configured to process fuel exhaust output from an air preheater heat exchanger, according to various embodiments of the present disclosure.

FIG. 5 is a perspective view of a WGS reactor 500 that may be configured to process fuel exhaust output from a central column, according to various embodiments of the present disclosure. Referring to FIG. 5, the WGS reactor 500 may include a reactor housing 502, an inlet 504, an outlet 506, a WGS catalyst 508, and optional detection ports 510.

The inlet 504 may be configured to receive fuel exhaust from a fuel exhaust conduit 153 configured to receive fuel exhaust output from an air preheater heat exchanger (e.g., output from a central column). The fuel exhaust may then be provided to the WGS catalyst 508 disposed in the housing 502, before exiting the housing 502 through the outlet 506 and being returned to the fuel exhaust conduit 153.

The WGS catalyst 508 may be in the form of discrete catalyst pucks. The detection ports 510 may be configured to receive thermocouples to detect the temperature of the fuel exhaust and/or gas sampling devices configured to detect the composition of the fuel exhaust as the fuel exhaust passes through the WGS reactor 500.

Fuel exhaust output from the WGS reactor 500 may be provided to the fuel inlet stream in the fuel inlet conduit 111, the hydrogen pump separator 150, or an additional heat exchanger, depending on the operating needs of a particular fuel cell system. In some embodiments, the WGS reactor 500 may include additional inlet/outlets paired with valves, if the WGS catalyst 508 requires pre-conditioning before operation.

The fuel cell systems described herein may have other embodiments and configurations, as desired. Other components may be added if desired. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
providing a fuel inlet stream to a fuel inlet of a fuel cell stack;
providing a fuel exhaust from a fuel exhaust outlet of the fuel cell stack to a splitter;
providing a first portion of the fuel exhaust from the splitter to an air preheater heat exchanger that preheats air provided to the fuel cell stack using the first portion of the fuel exhaust, the air preheater heat exchanger comprising a first water-gas shift (WGS) catalyst that is coated on a conduit of the air preheater heat exchanger that carries the first portion of the fuel exhaust;
providing the first portion of the fuel exhaust from an outlet of the air preheater heat exchanger to an anode inlet of an electrochemical pump separator comprising an electrolyte, a cathode, and an anode, and to a second WGS catalyst that is operatively connected to or integrated with the electrochemical pump separator;
providing a second portion of the fuel exhaust from the splitter to an anode tail gas oxidizer (ATO);
providing hydrogen output from a cathode outlet of the electrochemical pump separator to the fuel inlet stream; and
oxidizing separator exhaust output from an anode outlet of the electrochemical pump separator, the second portion of the fuel exhaust output from the splitter, and cathode exhaust output from the fuel cell stack in the ATO.

2. The method of claim 1, wherein the anode comprises a pure metal or metal alloy catalyst comprising Ag, Al, Au, Co, Cr, Cu, Fe, Ir, Mo, Ni, Pd, Pt, Ru, Rh, W, Zn, or any combination thereof.

3. The method of claim 1, wherein the second WGS catalyst is selected from Cu—Zn, Cu—Zn—Al, Fe—Cr, or Fe—Cr—Cu catalysts.

4. The method of claim 1, wherein the anode comprises a bonding agent and the second WGS catalyst.

5. The method of claim 1, wherein the second WGS catalyst is operatively connected to a fuel exhaust conduit upstream of the electrochemical pump separator with respect to a flow direction of the fuel exhaust through the fuel exhaust conduit.

6. The method of claim 1, wherein an air inlet conduit provides the air from the air preheater heat exchanger to an air inlet of the fuel cell stack.

7. The method of claim 6, wherein the air preheater heat exchanger is operatively connected to a fuel exhaust conduit and the air inlet conduit, wherein the air preheater heat exchanger cools the fuel exhaust using the air in the air inlet conduit.

8. The method of claim 1, wherein an air exhaust conduit is configured to receive air exhaust output from the fuel cell stack.

9. The method of claim 8, wherein an air heat exchanger is operatively connected to the air exhaust conduit and an air inlet conduit, wherein the air heat exchanger is configured to heat the air in the air inlet conduit using the air exhaust in the air exhaust conduit.

10. A fuel cell system, comprising:
a fuel cell stack;
an electrochemical pump separator comprising:
  an electrolyte;
  a cathode; and
  an anode;
a second water-gas shift (WGS) catalyst operatively connected to or integrated with the electrochemical pump separator;
a splitter;
a first fuel exhaust conduit that operatively connects a fuel exhaust outlet of the fuel cell stack to an inlet of the splitter;
a second fuel exhaust conduit that operatively connects a first outlet of the splitter to an anode inlet of the electrochemical pump separator;
an air preheater heat exchanger configured to preheat air provided to the fuel cell stack using fuel exhaust provided by the second fuel exhaust conduit, the air preheater heat exchanger comprising a first WGS catalyst that is coated on a conduit of the air preheater heat exchanger that carries the fuel exhaust;
a product conduit that operatively connects a cathode outlet of the electrochemical pump separator to a fuel inlet conduit configured to provide fuel to a fuel inlet of the fuel cell stack;
an anode tail gas oxidizer (ATO);
an air exhaust conduit that operatively connects an air exhaust outlet of the fuel cell stack to the ATO;
a conduit that operatively connects a second outlet of the splitter to the ATO; and
a separator exhaust conduit that operatively connects an anode outlet of the electrochemical pump separator to the ATO.

11. The system of claim 10, wherein the anode of the electrochemical pump separator comprises the second WGS catalyst.

12. The system of claim 11, further comprising:
an air inlet conduit configured to provide air from the air preheater to an air inlet of the fuel cell stack; and
a hydrogen cooler heat exchanger operatively connected to the product conduit and the air inlet conduit, the hydrogen cooler heat exchanger configured to cool the hydrogen in the product conduit using air in the air inlet conduit.

13. The system of claim 10, wherein the anode comprises a pure metal or metal alloy catalyst comprising Ag, Al, Au, Co, Cr, Cu, Fe, Ir, Mo, Ni, Pd, Pt, Ru, Rh, W, Zn, or any combination thereof.

14. The system of claim 10, wherein the second WGS catalyst is selected from Cu—Zn, Cu—Zn—Al, Fe—Cr, or Fe—Cr—Cu catalysts.

15. The system of claim 10, wherein the anode comprises a bonding agent and the second WGS catalyst.

16. The system of claim 10, wherein the second WGS catalyst is operatively connected to the second fuel exhaust conduit upstream of the electrochemical pump separator with respect to a flow direction of the fuel exhaust through the second fuel exhaust conduit.

17. The system of claim 10, wherein an air inlet conduit is configured to provide air from the air preheater heat exchanger to an air inlet of the fuel cell stack.

18. The system of claim 17, wherein the air preheater heat exchanger is operatively connected to the second fuel exhaust conduit and the air inlet conduit, wherein the air preheater heat exchanger is configured to cool the fuel exhaust using the air in the air inlet conduit.

19. The system of claim 10, wherein an air exhaust conduit is configured to receive air exhaust output from the fuel cell stack.

20. The system of claim 19, wherein an air heat exchanger is operatively connected to the air exhaust conduit and an air inlet conduit, wherein the air heat exchanger is configured to heat the air in the air inlet conduit using the air exhaust in the air exhaust conduit.

* * * * *